US010554408B2

(12) United States Patent
Zhang et al.

(10) Patent No.: US 10,554,408 B2
(45) Date of Patent: Feb. 4, 2020

(54) COMMUNICATION SYSTEM, NODE DEVICE, COMMUNICATION TERMINAL, KEY MANAGEMENT METHOD, AND NON-TRANSITORY COMPUTER-READABLE MEDIUM IN WHICH PROGRAM IS STORED

(71) Applicant: NEC Corporation, Tokyo (JP)

(72) Inventors: Xiaowei Zhang, Tokyo (JP); Anand Raghawa Prasad, Tokyo (JP)

(73) Assignee: NEC Corporation, Tokyo (JP)

(*) Notice: Subject to any disclaimer, the term of this patent is extended or adjusted under 35 U.S.C. 154(b) by 230 days.

(21) Appl. No.: 15/549,690

(22) PCT Filed: Feb. 12, 2016

(86) PCT No.: PCT/JP2016/000734
§ 371 (c)(1),
(2) Date: Aug. 9, 2017

(87) PCT Pub. No.: WO2016/132719
PCT Pub. Date: Aug. 25, 2016

(65) Prior Publication Data
US 2018/0026788 A1 Jan. 25, 2018

(30) Foreign Application Priority Data
Feb. 16, 2015 (JP) ................. 2015-027356

(51) Int. Cl.
*H04L 29/06* (2006.01)
*H04L 9/32* (2006.01)
(Continued)

(52) U.S. Cl.
CPC ............ *H04L 9/3226* (2013.01); *H04L 9/083* (2013.01); *H04L 9/14* (2013.01)

(58) Field of Classification Search
CPC combination set(s) only.
See application file for complete search history.

(56) References Cited

U.S. PATENT DOCUMENTS

2005/0271210 A1* 12/2005 Soppera ................ H04L 9/0836
380/277
2006/0036862 A1* 2/2006 Tuvell .................. G06F 21/6218
713/171
(Continued)

FOREIGN PATENT DOCUMENTS

EP 2720482 A1 4/2014
JP 2014-078894 A 5/2014
(Continued)

OTHER PUBLICATIONS

International Search Report corresponding to PCT/JP2016/000734, 3 pages, dated Apr. 26, 2016.
(Continued)

*Primary Examiner* — Malcolm Cribbs
(74) *Attorney, Agent, or Firm* — Wilmer Cutler Pickering Hale and Dorr LLP

(57) ABSTRACT

A communication system includes a plurality of communication terminals that form a communication group and a node device that carries out an authentication process on each of the communication terminals. The node device derives first keys unique to the respective communication terminals by using information shared between the node device and each communication terminal through the authentication process, derives a second key common to the communication group, calculates an exclusive OR between each first key and the second key, and transmits respective XOR values obtained through the calculation to the respective communication terminals. Each communication terminal reproduces the second key by calculating an exclusive OR of between the first key unique to the own communication terminal derived by using the information and the XOR value received from the node device. Thus, the keys used in group communication are managed more securely.

15 Claims, 10 Drawing Sheets

(51) Int. Cl.
*H04L 9/08* (2006.01)
*H04L 9/14* (2006.01)

(56) References Cited

U.S. PATENT DOCUMENTS

| | | | |
|---|---|---|---|
| 2006/0059347 A1* | 3/2006 | Herz | G06T 1/005 |
| | | | 713/176 |
| 2006/0115085 A1* | 6/2006 | Iwamura | H04L 9/0822 |
| | | | 380/259 |
| 2006/0291660 A1 | 12/2006 | Gehrmann et al. | |
| 2010/0159882 A1* | 6/2010 | He | H04L 63/205 |
| | | | 455/411 |
| 2011/0091036 A1 | 4/2011 | Norrman et al. | |
| 2011/0142239 A1* | 6/2011 | Suh | H04W 12/02 |
| | | | 380/270 |
| 2014/0105105 A1 | 4/2014 | Watanabe | |
| 2015/0012744 A1* | 1/2015 | Chen | H04W 12/04 |
| | | | 713/155 |
| 2015/0381577 A1* | 12/2015 | Reitsma | H04L 63/0428 |
| | | | 713/168 |
| 2016/0072775 A1* | 3/2016 | Choi | H04L 63/0428 |
| | | | 713/171 |
| 2016/0330209 A1* | 11/2016 | Iacob | H04L 9/0891 |

FOREIGN PATENT DOCUMENTS

| | | |
|---|---|---|
| WO | WO-99/04583 A1 | 1/1999 |
| WO | WO-2009/146729 A1 | 12/2009 |

OTHER PUBLICATIONS

Menezes, A.J. et al, Handbook of Applied Cryptography, CRC Press, 1997, especially 7.29 Definition (4 pages total).

3GPP TS 33.401, "3GPP System Architecture Evolution (SAE); Security architecture (Release 12)", V12.13.0, Chapters 6 and 7, Dec. 2014, (131 pages).

3GPP TS 33.102, "3G Security; Security architecture (Release 12)", V12.2.0, Chapter 6, Dec. 2014, (76 pages).

3GPP TR 33.833, "Study on Security issues to support Proximity Services (ProSe) (Release 13)", V1.2.0, Sections 6.3.2 to 6.3.5, Nov. 2014, (131 pages).

Extended European Search Report issued by the European Patent Office for European Application No. 16752109.5 dated Aug. 16, 2018 (8 pages).

Poornima, A. S. and Amberker, B. B., "A Secure Group Key Management Scheme for Sensor Networks," Fifth International Conference on Information Technology: New Generations, IEEE Computer Society, pp. 744-748 (2008).

\* cited by examiner

COMMUNICATION SYSTEM, NODE DEVICE, COMMUNICATION TERMINAL, KEY MANAGEMENT METHOD, AND NON-TRANSITORY COMPUTER-READABLE MEDIUM IN WHICH PROGRAM IS STORED

CROSS-REFERENCE TO RELATED APPLICATIONS

This application is a national stage application of International Application No. PCT/JP2016/000734 entitled "COMMUNICATION SYSTEM, NODE DEVICE, COMMUNICATION TERMINAL, KEY MANAGEMENT METHOD, AND NON-TRANSITORY COMPUTER-READABLE MEDIUM IN WHICH PROGRAM IS STORED," filed on Feb. 12, 2016, which claims the benefit of the priority of Japanese Patent Application No. 2015-027356 filed on Feb. 16, 2015, the disclosures of each of which are hereby incorporated by reference in their entirety.

TECHNICAL FIELD

The present invention relates to communication systems, node devices, communication terminals, key management methods, and programs and in particular relates to a technique for managing keys used in group communication.

BACKGROUND ART

In recent years, use of communication terminals such as cellular phones and smartphones has spread rapidly, and there are even cases where a single user owns a plurality of communication terminals. Furthermore, it is expected that, aside from communication terminals owned by users, use of M2M (Machine to Machine) terminals that autonomously communicate with other communication devices will increase in the future. M2M terminals are referred to as MTC (Machine Type Communication) devices in 3GPP (3rd Generation Partnership Project). An M2M terminal may, for example, be a vending machine provided with a communication function or may be a sensor device or the like having a communication function. An M2M terminal needs to be authenticated when communicating via a network, similarly to a cellular phone or the like. Aside from an increase in the use of M2M terminals, an increase in the use of wearable terminals, spread of networked consumer electrical appliances within households, and so on are expected in the future. It is assumed that a single user will own a plurality of wearable terminals. Examples of networked consumer electrical appliances include air conditioners, cleaning robots, and refrigerators.

Procedures pertaining to such above authentication are disclosed, for example, in NPL 1 and NPL 2. NPL 1 defines an authentication procedure in the LTE (Long Term Evolution) system, and NPL 2 defines an authentication procedure in the 3G system.

In 3GPP, it is being considered to group together a plurality of communication terminals to carry out group communication. In group communication, a key for establishing secure communication between a communication group to which communication terminals belong and a network (hereinafter, may be referred to as a "group key") needs to be used.

NPL 3 discloses a technique for managing such a group key. According to NPL 3, generally, a network generates a group key and distributes the group key to each communication terminal.

CITATION LIST

Non Patent Literature

NPL 1: 3GPP TS 33.401, "3GPP System Architecture Evolution (SAE); Security architecture (Release 12)," V12.13.0, Chapters 6 and 7, December, 2014

NPL 2: 3GPP TS 33.102, "3G Security; Security architecture (Release 12)," V12.2.0, Chapter 6, December, 2014

NPL 3: 3GPP TR 33.833, "Study on Security issues to support Proximity Services (ProSe) (Release 13)," V1.2.0, Sections 6.3.2 to 6.3.5, November, 2014

SUMMARY OF INVENTION

Technical Problem

However, the inventors of the present application have found that the technique disclosed in NPL 3 has an issue in that the security pertaining to the group key management is insufficient. Specifically, according to NPL 3, the group key itself is distributed from the network to the communication terminals. If the group key leaks, for example, to a malicious third party, the group communication may not be protected and may be listened to.

Accordingly, the present invention is directed to managing a key used in group communication more securely.

Solution to Problem

In order to achieve the above, a communication system according to a first aspect of the present invention includes a plurality of communication terminals that form a communication group, and a node device that carries out an authentication process on each of the communication terminals. The node device derives first keys unique to the respective communication terminals by using information shared between the node device and each communication terminal through the authentication process, derives a second key common to the communication group, calculates an exclusive OR between each first key and the second key, and transmits respective XOR (Exclusive OR) value obtained through the calculation to the respective communication terminals. Each communication terminal reproduces the second key by calculating an exclusive OR of between the first key unique to the own communication terminal derived by using the information and the XOR value received from the node device.

A node device according to a second aspect of the present invention is a node device that carries out an authentication process on each of a plurality of communication terminals that form a communication group. This node device includes a deriving unit that derives first keys unique to respective communication terminals by using information shared between the node device and each communication terminal through the authentication process and derives a second key common to the communication group, a calculating unit that calculates an exclusive OR of between each first key and the second key, and a transmitting unit that transmits the respective XOR values obtained by the calculating unit to the respective communication terminals.

A communication terminal according to a third aspect of the present invention is a communication terminal that forms a communication group together with another communication terminal. This communication terminal includes a deriving unit that derives a first key unique to the own communication terminal by using information shared between the communication terminal and a node device through an authentication process on the own communication terminal, a receiving unit that receives an XOR value from the node device, and a reproducing unit that reproduces a second key common to the communication group by calculating an exclusive OR between the first key and the XOR value. The XOR value is obtained by the node device calculating an exclusive OR between the first key and the second key.

A key management method according to a fourth aspect of the present invention is a method executed in a node device that carries out an authentication process on each of a plurality of communication terminals that form a communication group. This key management method includes deriving first keys unique to the respective communication terminals by using information shared between the node device and each communication terminal through the authentication process, deriving a second key common to the communication group, calculating an exclusive OR between each first key and the second key, and transmitting respective XOR value obtained in the calculating to the respective communication terminals.

A key management method according to a fifth aspect of the present invention is a method executed in a communication terminal that forms a communication group together with another communication terminal. This key management method includes deriving a first key unique to the communication terminal by using information shared between the communication terminal and a node device through an authentication process on the communication terminal, receiving an XOR value from the node device, and reproducing a second key common to the communication group by calculating an exclusive OR between the first key and the XOR value. The XOR value is obtained by the node device calculating an exclusive OR between the first key and the second key.

A program according to a sixth aspect of the present invention is a program to be executed by a computer that is a node device that carries out an authentication process on each of a plurality of communication terminals that form a communication group. This program causes the computer to execute a process of deriving first keys unique to the respective communication terminals by using information shared between the node device and each communication terminal through the authentication process, a process of deriving a second key common to the communication group, a process of calculating an exclusive OR between each first key and the second key, and a process of transmitting respective XOR values obtained in the calculating to the respective communication terminals.

A program according to a seventh aspect of the present invention is a program to be executed by a computer that is a communication terminal that forms a communication group together with another communication terminal. This program causes the computer to execute a process of deriving a first key unique to the communication terminal by using information shared between the communication terminal and a node device through an authentication process on the communication terminal, a process of receiving an XOR value from the node device, and a process of reproducing a second key common to the communication group by calculating an exclusive OR between the first key and the XOR value. The XOR value is obtained by the node device calculating an exclusive OR between the first key and the second key.

Advantageous Effects of Invention

According to the present invention, a key used in group communication can be managed more securely, and thus the problem described above can be solved.

DESCRIPTION OF EMBODIMENTS

Figure 1:
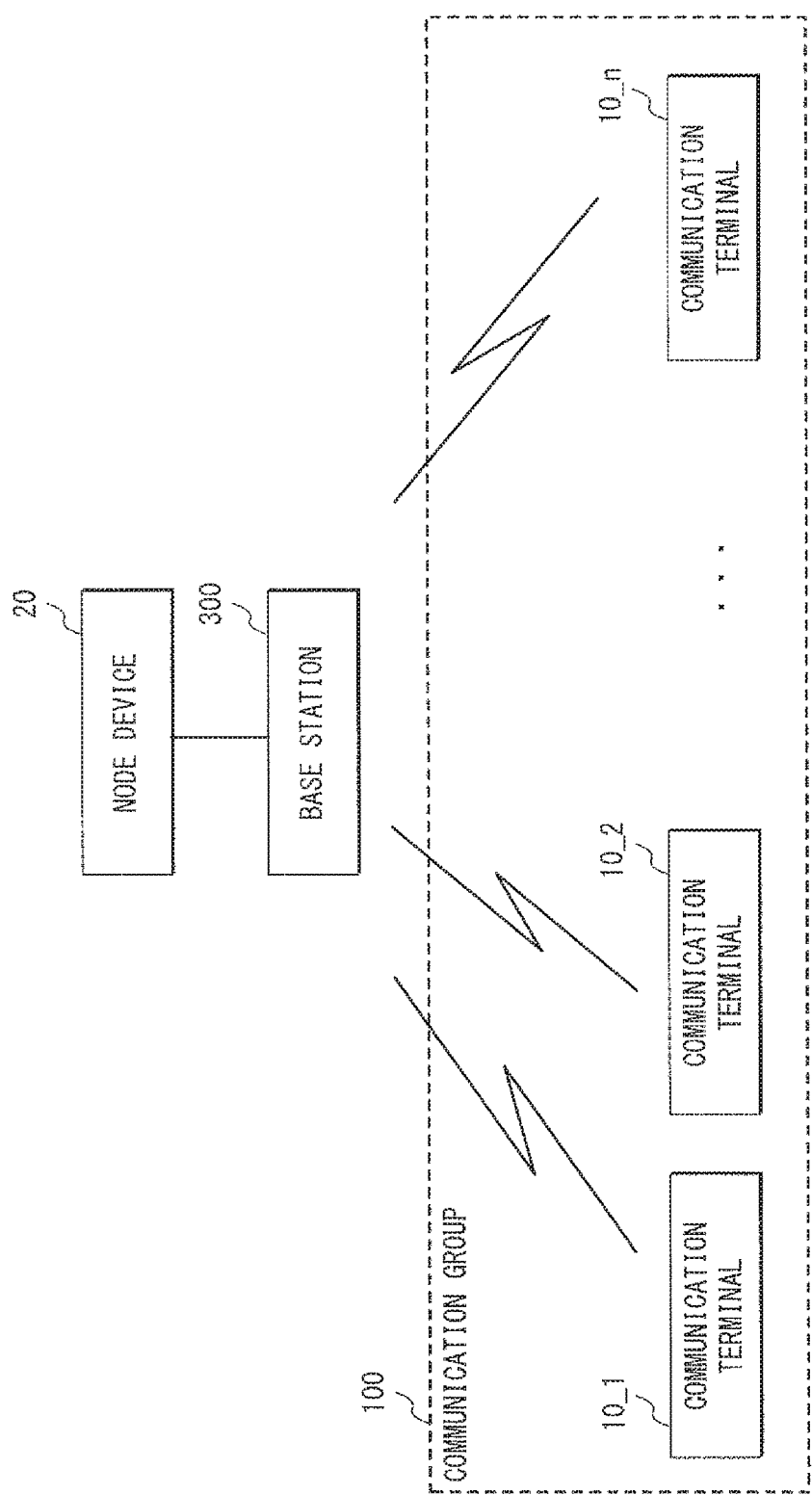
FIG. 1 is a block diagram illustrating a configuration example of a communication system according to Embodiment 1.

Hereinafter, Embodiments 1 to 6 according to the present invention will be described with reference to the drawings. It is to be noted that identical reference characters are given to identical elements in the drawings, and duplicate descriptions will be omitted as necessary in order to make the description clear.

<Embodiment 1>

As illustrated in FIG. 1, a communication system according to the present embodiment includes a plurality of communication terminals 10_1 to 10_n(n is an integer no smaller than 2) and a node device 20.

The communication terminals 10_1 to 10_n form a communication group 100 and thus receive a variety of services that use group communication. The communication terminals 10_1 to 10_nmay, for example, be cellular phones, smartphones, M2M terminals, computer devices having a communication function, or the like. The terminals that form the communication group 100 may, for example, be a plurality of wearable terminals worn by a user, networked consumer electrical appliances installed within a household, sensors and meters installed within a building, communication terminals used within a family or a certain group, vending machines managed by a manufacturer, or the like. The communication terminals 10_1 to 10_n communicate with the node device 20 via a base station 300. The communication terminals 10_1 to 10_n are connected to the base station 300 primarily wirelessly but may instead be connected to the base station 300 via cables. The base station 300 is connected to the node device 20 primarily via a cable but may instead be connected to the node device 20 wirelessly. In the following descriptions, the communication terminals 10_1 to 10_n may be collectively designated by the reference numeral 10.

Services that use group communication include, for example, a broadcast distribution service to members within the communication group 100. In other words, the communication terminals 10_1 to 10_n that belong to the communication group 100 can receive the same information simultaneously. Alternatively, a smartphone, a wearable device, and so on owned by a user may belong to the communication group 100, and the same information may be transmitted to the smartphone, the wearable device, and so on. Alternatively, the communication terminals 10_1 to 10_n may be present at locations that are far away from one another and can receive the same information at such remote locations.

The node device 20 carries out an authentication process on the communication terminals 10. The node device 20 may, for example, be MME (Mobility Management Entity), SGSN (Serving GPRS (General Packet Radio Service) Support Node), or the like that is defined in 3GPP as a device that executes an authentication process on UE (User Equipment).

The node device 20 executes, as an operation characteristic of the present embodiment, a variety of processes in order to securely manage keys used in group communication.

Figure 2:
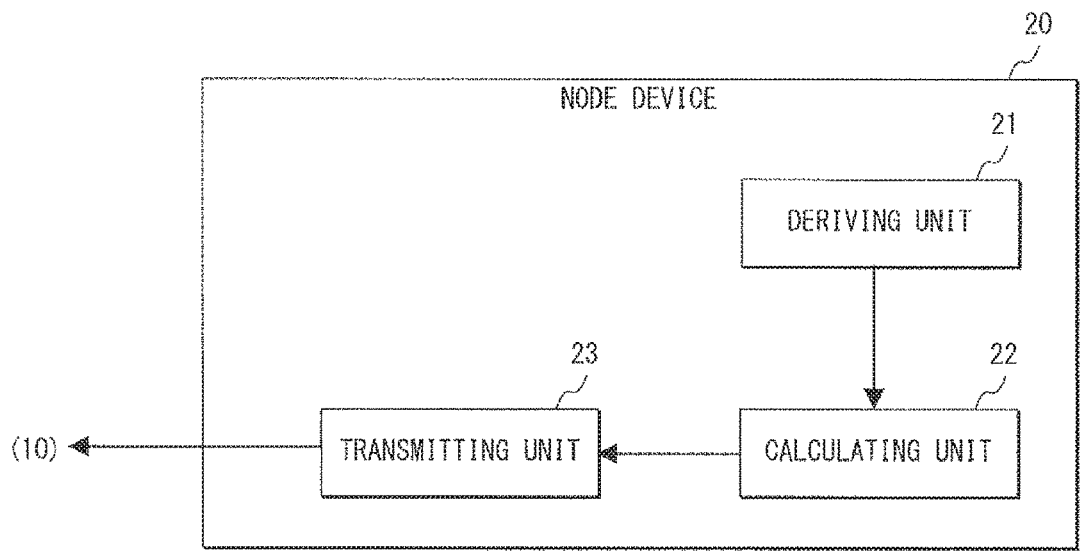
FIG. 2 is a block diagram illustrating a configuration example of a node device according to Embodiment 1.

Specifically, as illustrated in FIG. 2, the node device 20 includes a deriving unit 21, a calculating unit 22, and a transmitting unit 23.

The deriving unit 21 derives keys unique to the respective communication terminals 10_1 to 10_n (hereinafter, referred to as "group device keys") by using information shared between the node device 20 and each of the communication terminals 10_1 to 10_n through the authentication process (hereinafter, referred to as "shared information"). In addition, the deriving unit 21 derives a key common to the communication group 100 (hereinafter, referred to as a "group key").

As the shared information, Kasme (Key Access Security Management Entity) can be used when the node device 20 is MME, and CK (Cipher Key) and IK (Integrity Key) can be used when the node device 20 is SGSN. In addition, it would suffice if different group device keys are derived for the respective communication devices, and a variety of algorithms can be employed to derive the group device keys. An example of such an algorithm can be KDF (Key Derivation Function) defined by 3GPP. Furthermore, it would suffice if the group key is unique to the communication group 100, and a random numerical value can, for example, be used.

Figure 3:
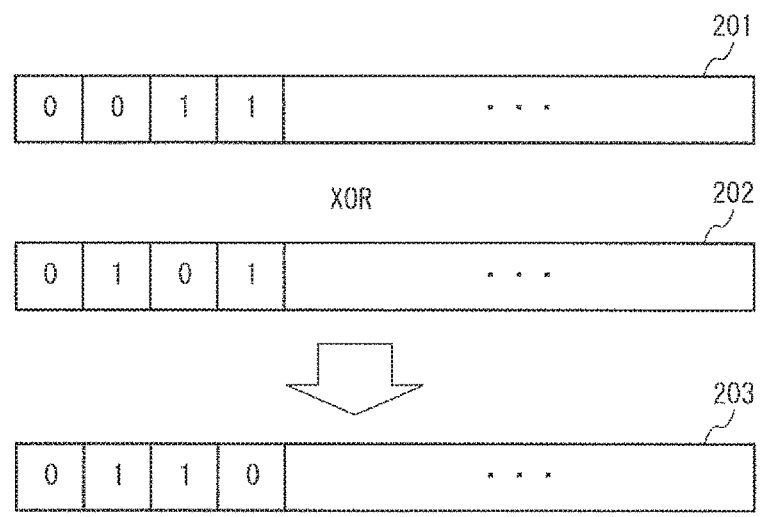
FIG. 3 illustrates an example of an arithmetic operation process in the node device according to Embodiment 1.

The calculating unit 22 calculates the exclusive OR between the group device key and the group key. This calculation process is executed on each communication terminal. For example, as illustrated in FIG. 3, the deriving unit 21 derives a group device key 201 composed of the bit string "0011 . . . " and a group key 202 composed of the bit string "0101 . . . " for a given communication terminal. In this case, the calculating unit 22 obtains an XOR (Exclusive OR or Exclusive disjunction) value 203 composed of the bit string "0110 . . . " as the result of calculating the exclusive OR. The bit length of each of the group device key 201, the group key 202, and the XOR value 203 may be set as desired and may be set in accordance with the communication standards or the like to be employed.

The transmitting unit 23 transmits the XOR values calculated for the respective communication terminals to the respective communication terminals 10_1 to 10_n.

The deriving unit 21, the calculating unit 22, and the transmitting unit 23 can be constituted at least by hardware. Such hardware includes, for example, a transceiver that communicates with the communication terminals 10 and a controller, such as a CPU (Central Processing Unit), that controls the transceiver.

Figure 4:
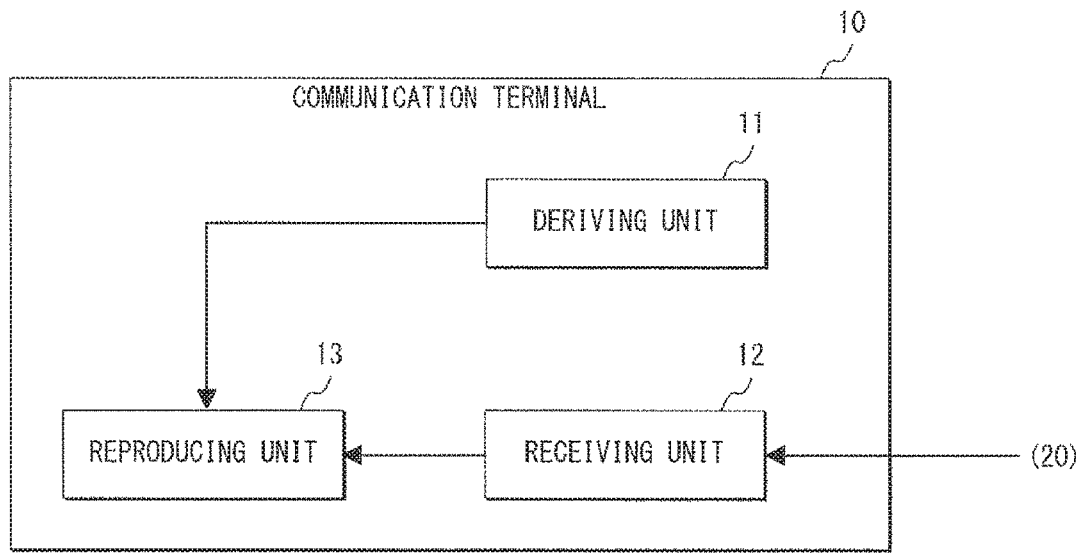
FIG. 4 is a block diagram illustrating a configuration example of a communication terminal according to Embodiment 1.

As illustrated in FIG. 4, the communication terminal 10 includes a deriving unit 11, a receiving unit 12, and a reproducing unit 13.

The deriving unit 11 derives a group device key unique to the own communication terminal 10 by using the shared information described above. At this point, the deriving unit 11 employs an algorithm identical to the one employed by the node device 20 and thus derives a group device key identical to the one derived by the node device 20. When there are a plurality of candidate algorithms and candidate pieces of information that can be employed, the algorithm and the node device 20 may issue an instruction regarding the information to be employed. Such an instruction can be issued with the use of, for example, KSI (Key Set Identifier) or the like.

The receiving unit 12 receives the XOR value calculated for the own communication terminal 10 from the node device 20.

Figure 5:
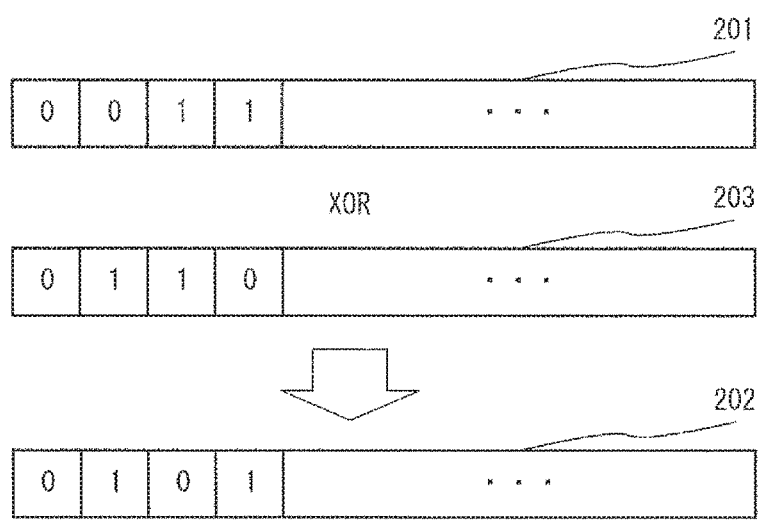
FIG. 5 illustrates an example of an arithmetic operation process in the communication terminal according to Embodiment 1.

The reproducing unit 13 reproduces (derives, acquires) the group key common to the node device 20 by calculating the exclusive OR between the group device key derived by the deriving unit 11 and the XOR value received by the receiving unit 12. Now, as illustrated in FIG. 5, the deriving unit 11 derives the group device key 201 composed of the bit string "0011 . . . " identical to the one illustrated in FIG. 3, and the receiving unit 12 receives the XOR value 203 composed of the bit string "0110 . . . " identical to the one illustrated in FIG. 3. In this case, the reproducing unit 13 obtains the bit string "0101 . . . " as the result of calculating the exclusive OR. This bit string "0101 . . . " is identical to the group key 202 illustrated in FIG. 3.

The deriving unit 11, the receiving unit 12, and the reproducing unit 13 can be constituted at least by hardware. Such hardware includes, for example, a transceiver that communicates with the node device 20 and a controller, such as a CPU, that controls the transceiver.

As described thus far, in the present embodiment, the group key is shared between the node device 20 and the communication terminal 10 without being distributed from the node device 20 to the communication terminal 10. Thus, the group key will not leak to a third party, and as a result group communication cannot be listened to. Therefore, according to the present embodiment, the group key can be managed more securely than in the prior art techniques such as the one disclosed in NPL 3.

In addition, even if an XOR value leaks out, the group key cannot be reproduced with the XOR value alone, as described above. Thus, it is extremely difficult for a third party to reproduce the group key. As will be described later, the XOR value may be encrypted and transmitted from the node device 20 to the communication terminal 10. This makes it even more difficult for a third party to reproduce the group key.

<Embodiment 2>

In the present embodiment, generally, the concept described in Embodiment 1 above is applied to the LTE system.

Figure 6:
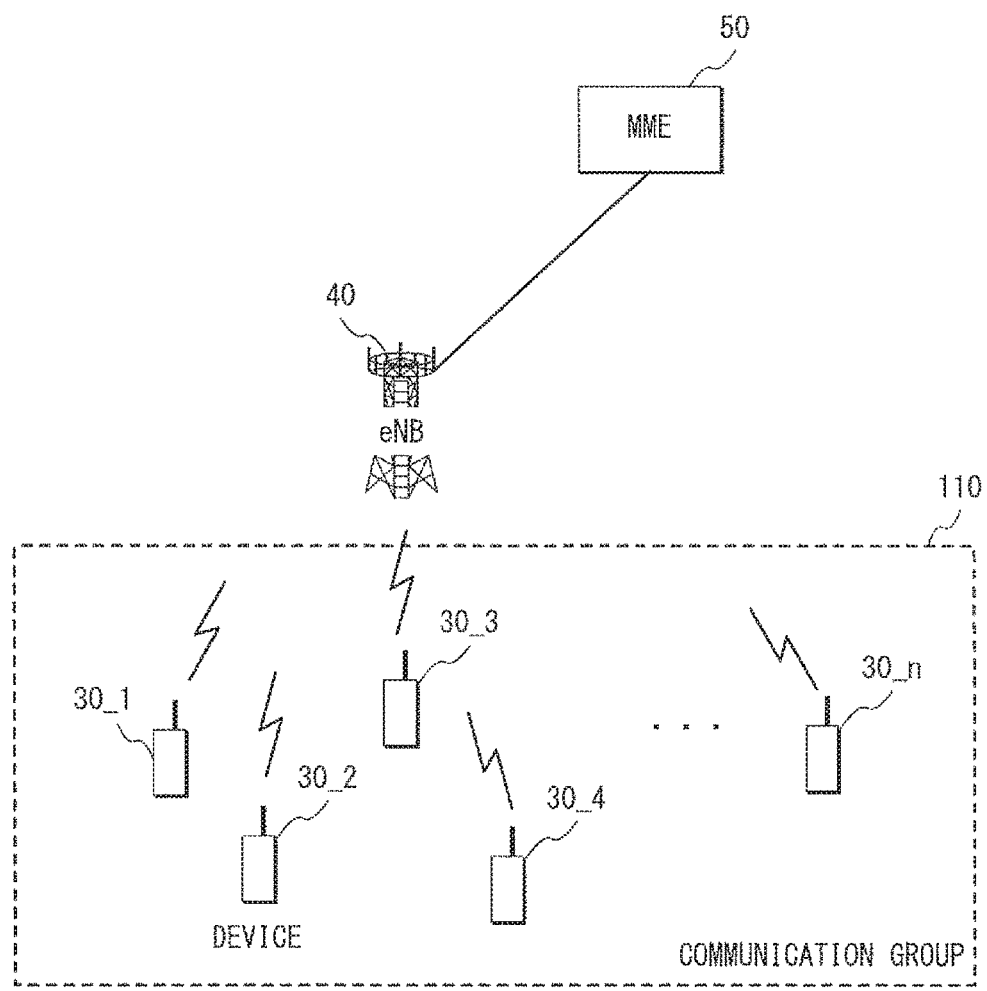
FIG. 6 is a block diagram illustrating a configuration example of a communication system according to Embodiment 2.

As illustrated in FIG. 6, a communication system according to the present embodiment includes a plurality of devices 30_1 to 30_n (hereinafter, may be collectively designated by the reference numeral 30), an eNB (evolved Node B) 40, which is a type of a wireless base station, and an MME 50. The devices 30_11 to 30_n correspond to the communication terminals 10_11 to 10_n illustrated in FIG. 1 and can be configured similarly to the communication terminal 10 illustrated in FIG. 4 except in that the devices 30_11 to 30_n execute a process pertaining to signaling compliant with the LTE standards and so on. The MME 50 corresponds to the node device 20 illustrated in FIG. 1 and can be configured similarly to the node device 20 illustrated in FIG. 2 except in that the MME 50 executes a process pertaining to signaling compliant with the LTE standards and so on. Traffic between the device 30 and the MME 50 is transmitted via a wireless link between the device 30 and the eNB 40 and via a backhaul link between the eNB 40 and the MME 50. The example illustrated in FIG. 6 deals with a case in which the devices 30_11 to 30_n wirelessly connect to the same eNB 40, but the devices 30_11 to 30_n may wirelessly connect to mutually different eNBs.

Figure 7:
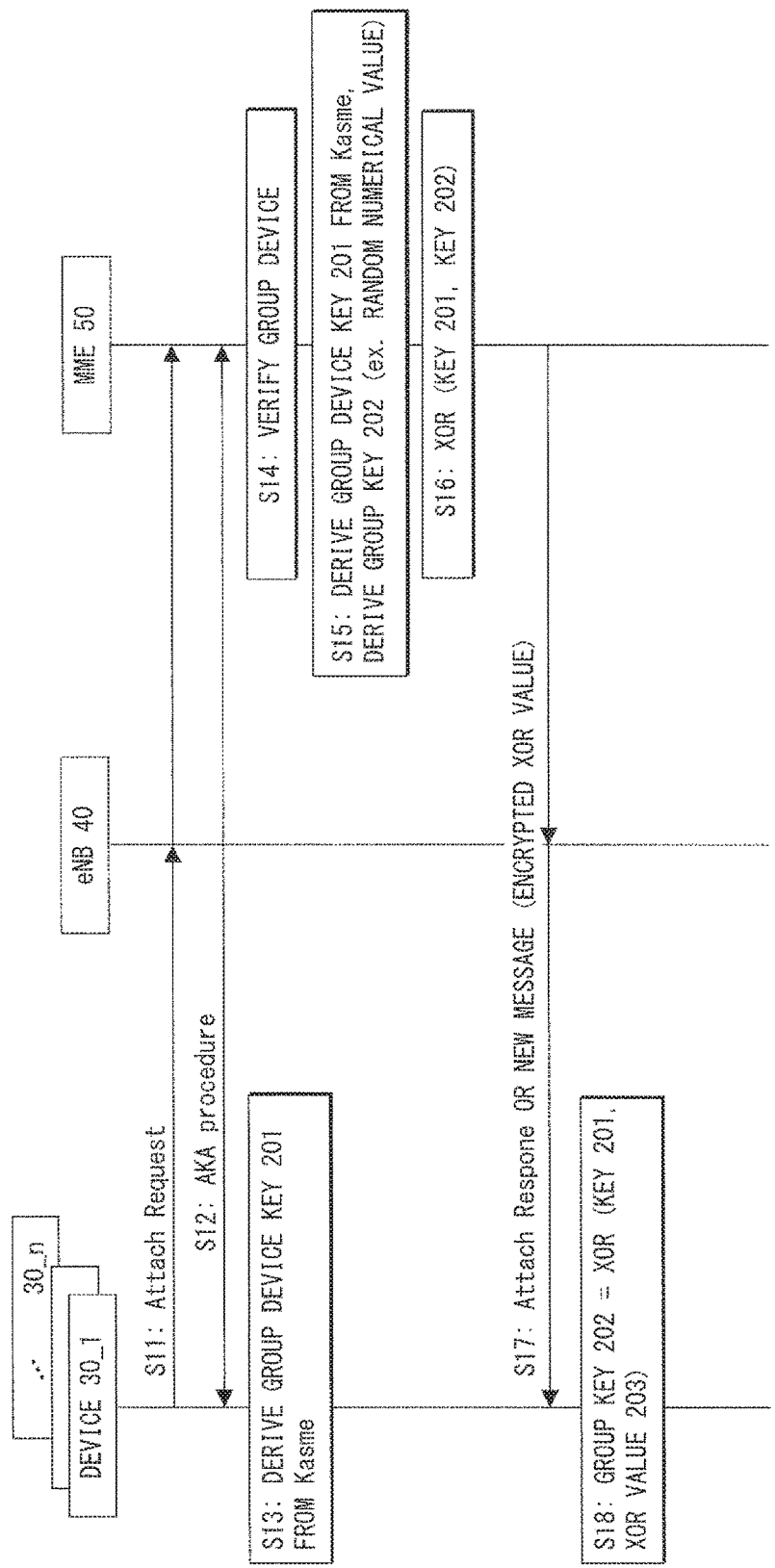
FIG. 7 is a sequence diagram illustrating an operation example of the communication system according to Embodiment 2.

In operation, as illustrated in FIG. 7, first, each of the devices 30_11 to 30_n transmits an Attach Request message to the MME 50 via the eNB 40 and thus requests for attachment to the MME 50 (step S11). Then, an authentication process, or in other words, AKA (Authentication and Key Agreement) Procedure as disclosed in NPL 1 is executed on each of the devices 30_1 to 30_n with the MME 50 leading the process (step S12). The success of this AKA Procedure allows each of the devices 30_1 to 30_n and the MME 50 to share Kasme. For example, the device 30_1 shares Kasme_1 with the MME 50 and the device 30_2 shares Kasme_2 (different from Kasme_1) with the MME 50.

The devices 30_1 to 30_n derive respective group device keys 201_1 to 201_n unique to the devices from Kasme_1 to Kasmen_n (step S13).

Meanwhile, the MME 50 verifies whether each of the devices 30_1 to 30_n can receive a service that uses group communication (step S14). Such verification may be carried out, for example, on the basis of subscription information of the devices 30_1 to 30_n, a network policy, or the like. Upon the verification having been successful, the MME 50 derives the group device keys 201_1 to 201_n unique to the devices 30_1 to 30_n from Kasme_1 to Kasmen_ n and derives a group key 202 (e.g., random numerical value) common to a communication group 110 to which the devices 30_1 to 30_n belong (step S15).

In addition, the MME 50 calculates the exclusive OR between each of the group device keys 201_1 to 201_n and the group key 202 and thus obtains XOR values 203_1 to 203_n (step S16).

Then, the MME 50 transmits an Attach Response message containing the XOR values 203_1 to 203_n to the respective devices 30_1 to 30_n via the eNB 40 (step S17).

At this point, the MME 50 encrypts the XOR values 203_1 to 203_n and embeds them into the Attach Response message. For encryption, NAS (Non Access Stratum) security context shared between each of the devices 30_1 to 30_n and the MME 50 in AKA Procedure can be used. The NAS security context includes NAS keys, and the NAS keys are used to protect the integrity and the confidentiality of the traffic between UE and the MME. The MME 50 may embed the encrypted XOR values 203_1 to 203_n into a message (e.g., a new message) different from the Attach Response message.

Upon receiving the Attach Response message, the devices 30_1 to 30_n decrypt the XOR values 203_1 to 203_n by using the NAS security context described above and calculate the exclusive OR between the group device keys 201_1 to 201_n and the respective XOR values 203_1 to 203_n. Thus, the group key 202 is reproduced in each of the devices 30_1 to 30_n and is thus shared between each of the devices 30_1 to 30_n and the MME 50 (step S18). The principle with which the group key is reproduced in the devices is similar to the principle described above with reference to FIG. 3 and FIG. 5.

According to the present embodiment, a group key can be managed securely in the LTE system similarly to Embodiment 1 described above. In addition, the security in the group key management can be further improved through the encryption of the XOR values.

<Embodiment 3>

In the present embodiment, generally, the concept described in Embodiment 1 above is applied to the 3G system.

Figure 8:
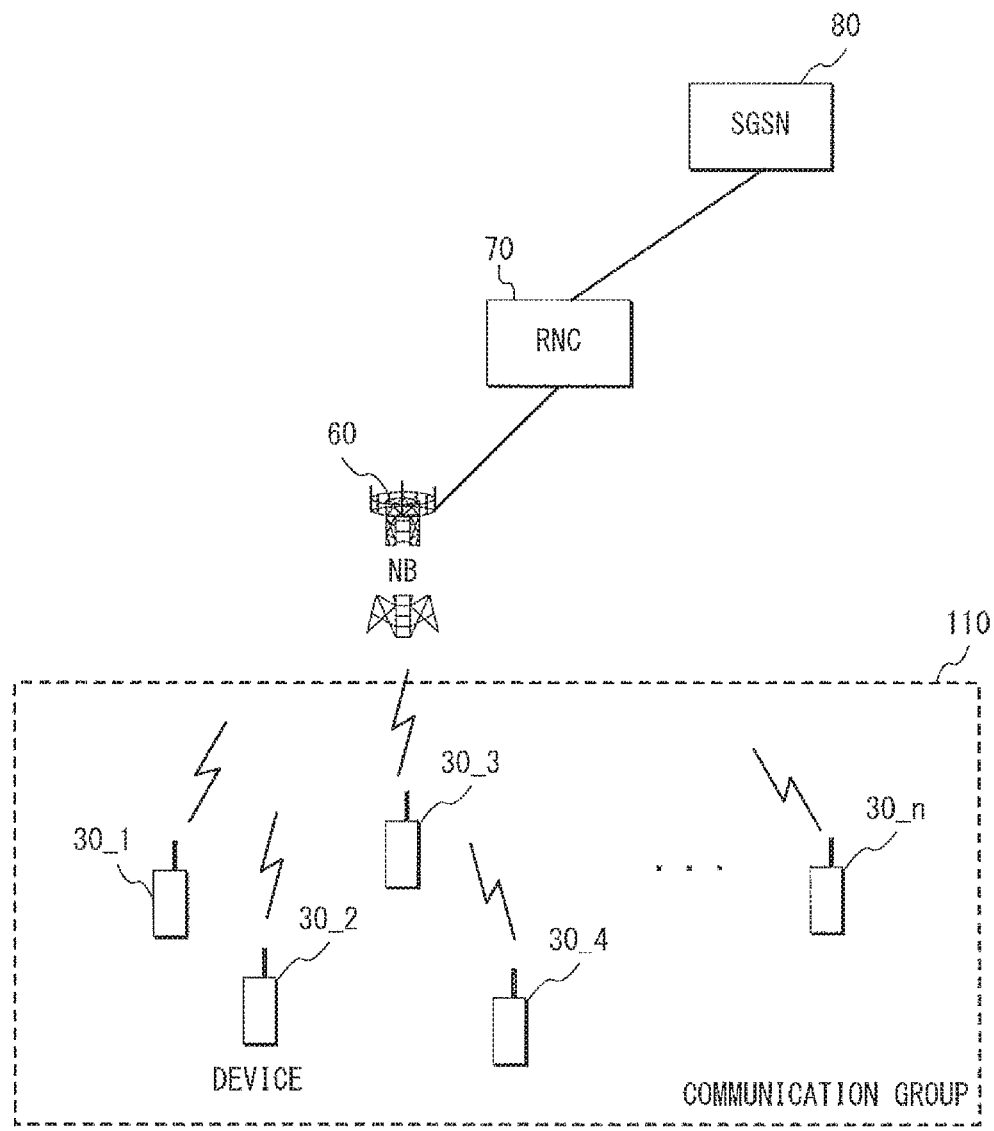
FIG. 8 is a block diagram illustrating a configuration example of a communication system according to Embodiment 3.

As illustrated in FIG. 8, a communication system according to the present embodiment includes a plurality of devices 30_1 to 30_n, an NB (Node B) 60, which is a type of a wireless base station, an RNC (Radio Network Controller) 70 that controls the NB 60, and an SGSN 80. The devices 30_1 to 30_n correspond to the communication terminals 10_1 to 10_n illustrated in FIG. 1 and can be configured similarly to the communication terminal 10 illustrated in FIG. 4 except in that the devices 30_1 to 30_n execute a process pertaining to signaling compliant with the 3G standards and so on. The SGSN 80 corresponds to the node device 20 illustrated in FIG. 1 and can be configured similarly to the node device 20 illustrated in FIG. 2 except in that the SGSN 80 executes a process pertaining to signaling compliant with the 3G standards and so on. Traffic between the device 30 and the SGSN 80 is transmitted via a wireless link between the device 30 and the NB 60 and via a backhaul link between the NB 60, the RNC 70, and the SGSN 80. The example illustrated in FIG. 8 deals with a case in which the devices 30_1 to 30_n wirelessly connect to the same NB 60, but the devices 30_1 to 30_n may wirelessly connect to mutually different NBs.

Figure 9:
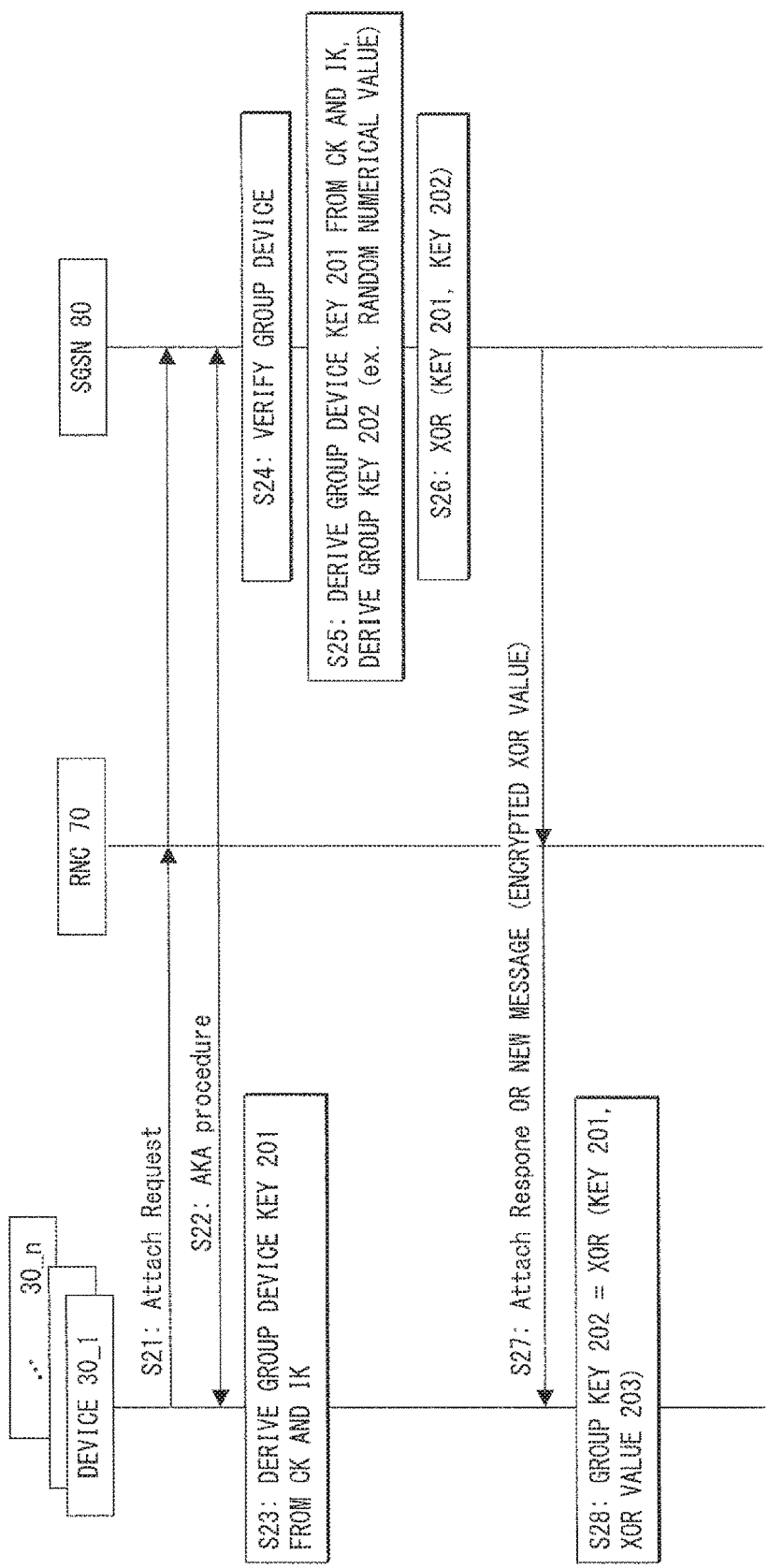
FIG. 9 is a sequence diagram illustrating an operation example of the communication system according to Embodiment 3.

In operation, as illustrated in FIG. 9, first, each of the devices 30_1 to 30_n transmits an Attach Request message to the SGSN 80 via the RNC 70 (and the NB 60 (not illustrated)) and thus requests for attachment to the SGSN 80 (step S21). Then, an authentication process, or in other words, AKA Procedure as disclosed in NPL 2 is executed on each of the devices 30_ 1 to 30_n with the SGSN 80 leading the process (step S22). The success of this AKA Procedure allows each of the devices 30_1 to 30_n and the SGSN 80 to share CK and IK. For example, the device 30_1 shares CK_1 and IK_1 with the SGSN 80, and the device 30_2 shares CK_2 and IK_2 (different from CK_1 and IK_1, respectively) with the SGSN 80.

The devices 30_1 to 30_n derive respective group device keys 201_1 to 201_n unique to the devices from CK_1 to CK_n and IK_1 to IK_n (step S23).

Meanwhile, the SGSN 80 verifies whether each of the devices 30_1 to 30_n can receive a service that uses group communication (step S24). Such verification may be carried out, for example, on the basis of subscription information of the devices 30_1 to 30_n, a network policy, or the like. Upon the verification having been successful, the SGSN 80 derives the group device keys 201_1 to 201_n unique to the respective devices 30_1 to 30_n from CK_1 to CK_n and IK_1 to IK_n and derives a group key 202 (e.g., random numerical value) common to a communication group 110 to which the devices 30_1 to 30_n belong (step S25).

In addition, the SGSN 80 calculates the exclusive OR between each of the group device keys 201_1 to 201_n and the group key 202 and thus obtains XOR values 203_1 to 203_n (step S26).

Then, the SGSN 80 transmits an Attach Response message containing the XOR values 203_1 to 203_n to the respective devices 30_1 to 30_n via the RNC 70 (step S27).

At this point, the SGSN 80 encrypts the XOR values 203_1 to 203_n and embeds them into the Attach Response message. For encryption, UMTS (Universal Mobile Telecommunications System) security context shared between each of the devices 30_1 to 30_n and the SGSN 80 in AKA Procedure can be used. The UMTS security context includes UMTS keys, and the UMTS keys are used to protect the integrity and the confidentiality of the traffic between UE and the SGSN. The SGSN 80 may embed the encrypted XOR values 203_1 to 203_n into a message (e.g., a new message) different from the Attach Response message.

Upon receiving the Attach Response message, the devices 30_1 to 30_n decrypt the XOR values 203_1 to 203_n by using the UMTS security context described above and calculate the exclusive OR between the group device keys 201_1 to 201_n and the respective XOR values 203_1 to 203_n. Thus, the group key 202 is reproduced in each of the devices 30_1 to 30_n and is thus shared between each of the devices 30_1 to 30_n and the SGSN 80 (step S28). The principle with which the group key is reproduced in the devices is similar to the principle described above with reference to FIG. 3 and FIG. 5.

According to the present embodiment, a group key can be managed securely in the 3G system similarly to Embodiment 1 described above. In addition, the security in the group key management can be further improved through the encryption of the XOR values.

<Embodiment 4>

Figure 10:
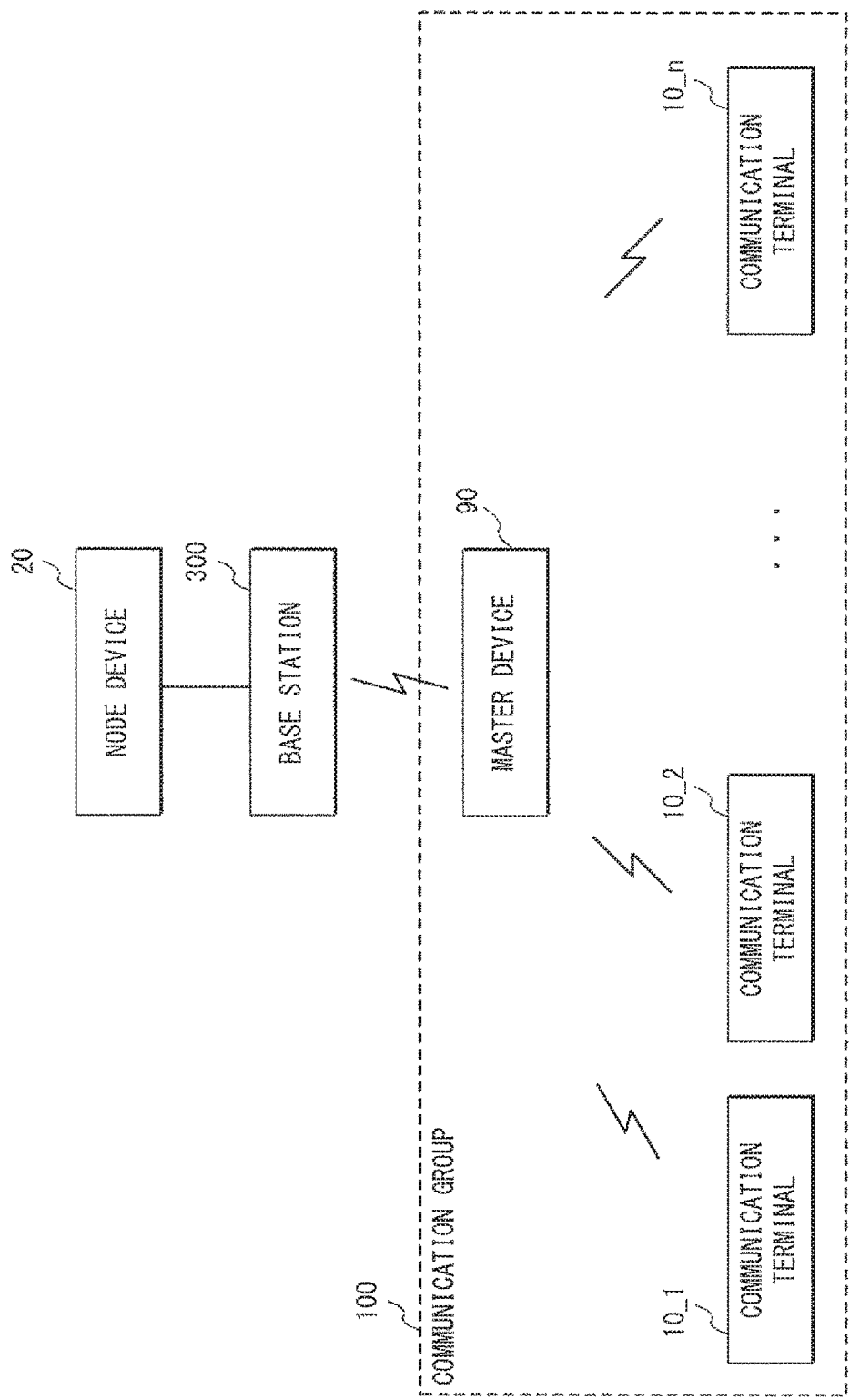
FIG. 10 is a block diagram illustrating a configuration example of a communication system according to Embodiment 4.

As illustrated in FIG. 10, a communication system according to the present embodiment differs from Embodiment 1 described above in that a master device (also referred to as a base unit, a base device, or the like) 90 is provided in addition to the configuration of the communication system illustrated in FIG. 1.

The master device 90 is one communication terminal that represents a communication group 100. The master device 90 may, for example, be a cellular phone, a smartphone, an M2M terminal, a computer device having a communication function, or the like. Alternatively, the master device 90 may be a mobile router. When the master device 90 is a mobile router, a cellular phone, a smartphone, an M2M terminal, or the like, the master device 90 is connected to a base station 300 wirelessly as illustrated in FIG. 10. However, when the master device 90 is a stationary wireless router or the like, the master device 90 is connected to the base station 300 via a cable.

In operation, the master device 90 receives, from a node device 20, XOR values calculated for respective communication terminals (also referred to as handsets, slaves, or the like) 10_1 to 10_n and distributes the received XOR values to the communication terminals 10_1 to 10_n. Meanwhile, similarly to Embodiment 1 described above, the communication terminals 10_1 to 10_n are individually authenticated by the node device 20, and a deriving unit 11 (refer to FIG. 4) of each of the communication terminals 10_1 to 10_n derives a group device key by using the shared information described above. Then, a receiving unit 12 receives the XOR value distributed by the master device 90, and a reproducing unit 13 reproduces a group key by calculating the exclusive OR between the group device key derived by the deriving unit 11 and the XOR value received by the receiving unit 12.

In this manner, in the present embodiment, the master device 90 receives the XOR values from the node device 20, representing the communication group 110. Thus, the amount of signaling required for transmitting the XOR values can be reduced as compared to Embodiment 1 described above. Similarly to Embodiment 1 described above, the group key is of course not distributed from the node device 20 to the communication terminal 10, and thus the group key can be managed securely as well.

The communication between the master device 90 and the communication terminal 10 may be carried out in compliance with a desired communication protocol. The master device 90 may, for example, communicate with the communication terminal 10 via wireless LAN (Local Area Network) communication or may communicate with the communication terminal 10 via near-field wireless communication, such as Bluetooth (registered trademark) or NFC (Near Field Communication). When the communication terminal 10 is located at a remote location, the master device 90 may communicate with the communication terminal 10 via a mobile network.

<Embodiment 5>

In the present embodiment, generally, both the concept described in Embodiment 1 above and the concept described in Embodiment 4 above are applied to the LTE system.

Although not illustrated, a communication system according to the present embodiment can be configured similarly to the communication system illustrated in FIG. 6 except in that a master device 90 is interposed between devices 30_1 to 30_n and an eNB 40.

Figure 11:
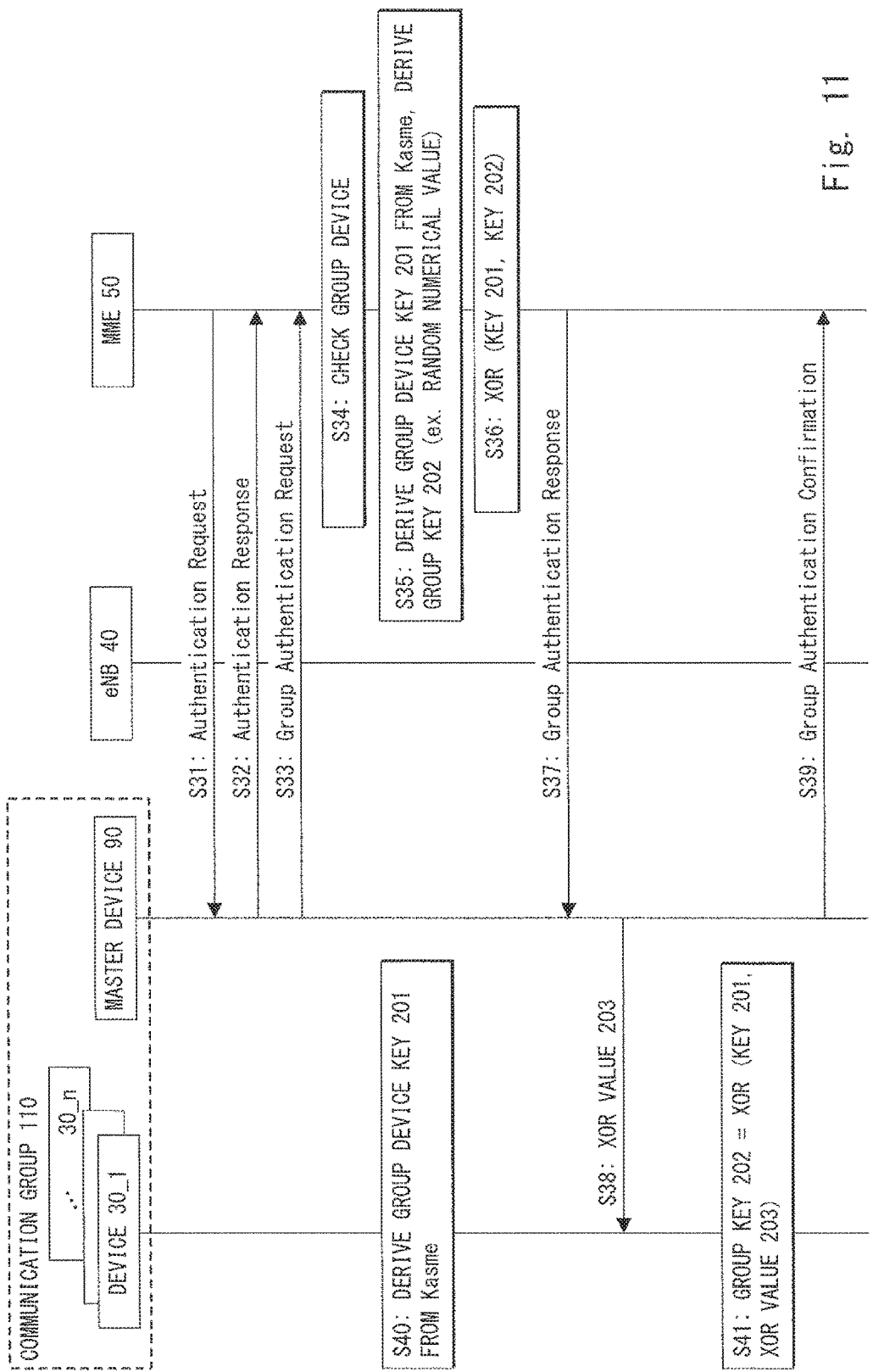
FIG. 11 is a sequence diagram illustrating an operation example of a communication system according to Embodiment 5.

In operation, as illustrated in FIG. 11, first, in order to execute an authentication process for carrying out normal communication via a mobile network in the master device 90 and an MME 50, the MME 50 transmits an Authentication Request message to the master device 90 (step S31). At this point, the MME 50 embeds AV (Authentication Vector) into the Authentication Request message.

The master device 90 executes a predetermined arithmetic operation by using the AV received from the MME 50 and SIM (Subscriber Identity Module) information and key information of the master device 90 and transmits, to the MME 50, the result of the arithmetic operation embedded in an Authentication Response message (step S32). The MME 50 executes an authentication process pertaining to the master device 90 by using the result of the arithmetic operation received from the master device 90 and the result of an arithmetic operation in the MME 50.

Then, in order to execute an authentication process pertaining to a communication group 110, the master device 90 transmits a Group Authentication Request message to the MME 50 (step S33). At this point, the master device 90, for example, sets information for identifying the communication group 110 in the Group Authentication Request message. Furthermore, the master device 90 may set identification information of all the devices 30_1 to 30_n that belong to the communication group 110 in the Group Authentication Request message.

The MME 50 checks the devices (also referred to as handsets, slaves, or the like) 30_1 to 30_n that belong to the communication group 110 by using the information included in the Group Authentication Request message (step S34).

In addition, similarly to step S15 in FIG. 7, the MME 50 derives group device keys 201_1 to 201_n unique to the respective devices 30_1 to 30_n from Kasme_1 to Kasmen_n and derives a group key 202 (e.g., random numerical value) common to the communication group 110 to which the devices 30_1 to 30_n belong (step S35).

Furthermore, the MME 50 calculates the exclusive OR between each of the group device keys 201_ to 201_n and the group key 202 and thus obtains XOR values 203_1 to 203_n (step S36).

Then, the MME 50 transmits a Group Authentication Response message containing the XOR values 203_1 to 203_n to the master device 90 (step S37). At this point, similarly to Embodiment 2 described above, the MME 50 may encrypt the XOR values 203_1 to 203_n and embed them into the Group Authentication Response message. In that case, the privacy is enhanced, and increased security is ensured. In addition, the MME 50 may embed Group AV associated with the communication group 110 into the Group Authentication Response message. Such Group AV can, for example, be used in the authentication of the devices 30_1 to 30_n by the master device 90.

The master device 90 distributes the XOR values 203_1 to 203_n received from the MME 50 to the devices 30_1 to 30_n (step S38). In addition, the master device 90 transmits a Group Authentication Confirmation message to the MME 50 (step S39). When authenticating the devices 30_1 to 30_n, the master device 90 may transmit, to the MME 50, the result of the authentication embedded in the Group Authentication Confirmation message to make the MME 50 recognize the devices 30_1 to 30_n that belong to the communication group 110.

Meanwhile, although not illustrated, the devices 30_1 to 30_n have been authenticated individually by the MME 50 in the AKA Procedure illustrated in FIG. 7 and share Kasme_1 to Kasmen_n with the MME 50. Thus, the devices 30_1 to 30_n derive the respective group device keys 201_1 to 201_n unique to the devices from Kasme_1 to Kasmen_n (step S40).

Then, upon receiving the XOR values 203_ to 203_n from the master device 90 in step S38 described above, the devices 30_1 to 30_n reproduce the group key 202 by calculating the exclusive OR between the group device keys 201_1 to 201_n and the respective XOR values 203_1 to 203_n (step S41). When the XOR values 203_1 to 203_n are encrypted, the devices 30_1 to 30_n can decrypt them by using the NAS security context described above.

According to the present embodiment, the amount of signaling required for transmitting the XOR values can be reduced in the LTE system. In addition, the group key can be managed securely similarly to Embodiment 2 described above. Furthermore, the security in the group key management can be further improved through the encryption of the XOR values.

<Embodiment 6>

In the present embodiment, generally, both the concept described in Embodiment 1 above and the concept described in Embodiment 4 above are applied to the 3G system.

Although not illustrated, a communication system according to the present embodiment can be configured similarly to the communication system illustrated in FIG. 8 except in that a master device 90 is interposed between devices 30_1 to 30_n and an NB 60.

Figure 12:
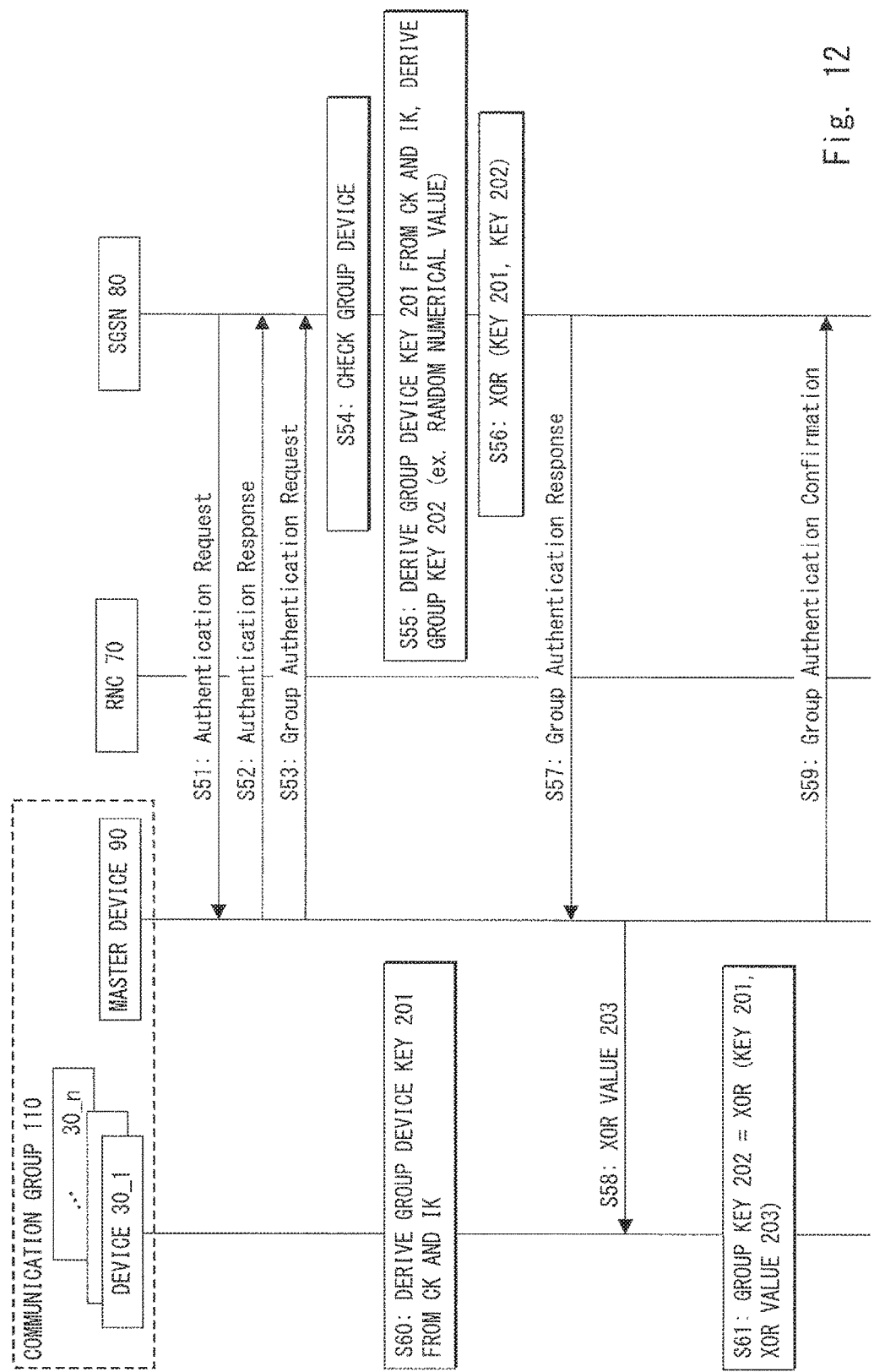
FIG. 12 is a sequence diagram illustrating an operation example of a communication system according to Embodiment 6.

In operation, as illustrated in FIG. 12, first, in order to execute an authentication process for carrying out normal communication via a mobile network in the master device 90 and an SGSN 80, the SGSN 80 transmits an Authentication Request message to the master device 90 (step S51). At this point, the SGSN 80 embeds AV into the Authentication Request message.

The master device 90 executes a predetermined arithmetic operation by using the AV received from the SGSN 80 and SIM information and key information of the master device 90 and transmits, to the SGSN 80, the result of the arithmetic operation embedded in an Authentication Response message (step S52). The SGSN 80 executes an authentication process pertaining to the master device 90 by using the result of the arithmetic operation received from the master device 90 and the result of an arithmetic operation in the SGSN 80.

Then, in order to execute an authentication process pertaining to a communication group 110, the master device 90 transmits a Group Authentication Request message to the SGSN 80 (step S53). At this point, the master device 90, for example, sets information for identifying the communication group 110 in the Group Authentication Request message. Furthermore, the master device 90 may set identification information of all the devices 30_1 to 30_n that belong to the communication group 110 in the Group Authentication Request message.

The SGSN 80 checks the devices 30_1 to 30_n that belong to the communication group 110 by using the information included in the Group Authentication Request message (step S54).

In addition, similarly to step S25 in FIG. 9, the SGSN 80 derives group device keys 201_1 to 201_n unique to the respective devices 30_1 to 30_n from CK_1 to CK_n and IK_1 to IK_n and derives a group key 202 (e.g., random numerical value) common to the communication group 110 to which the devices 30_1 to 30_n belong (step S55).

Furthermore, the SGSN 80 calculates the exclusive OR between each of the group device keys 201_1 to 201_n and the group key 202 and thus obtains XOR values 203_1 to 203_n (step S56).

Then, the SGSN 80 transmits a Group Authentication Response message containing the XOR values 203_1 to 203_n to the master device 90 (step S57). At this point, similarly to Embodiment 3 described above, the SGSN 80 may encrypt the XOR values 203_1 to 203_n and embed them into the Group Authentication Response message. In that case, the privacy is enhanced, and increased security is ensured. In addition, the SGSN 80 may embed Group AV associated with the communication group 110 into the Group Authentication Response message. Such Group AV can, for example, be used in the authentication of the devices 30_1 to 30_n by the master device 90.

The master device 90 distributes the XOR values 203_1 to 203_n received from the SGSN 80 to the devices 30_1 to 30_n (step S58). In addition, the master device 90 transmits a Group Authentication Confirmation message to the SGSN 80 (step S59). When authenticating the devices 30_ 1 to 30_n, the master device 90 may transmit, to the SGSN 80, the result of the authentication embedded in the Group Authentication Confirmation message to make the SGSN 80 recognize the devices 30_1 to 30_n that belong to the communication group 110.

Meanwhile, although not illustrated, the devices 30_1 to 30_n have been authenticated individually by the MME 50 in the AKA Procedure illustrated in FIG. 9 and share CK_1 to CK_n and IK_1 to IK_n with the SGSN 80. Thus, the devices 30_1 to 30_n derive the respective group device keys 201_ 1 to 201_n unique to the devices from CK_1 to CK_n and IK_1 to IK_n (step S60).

Then, upon receiving the XOR values 203_1 to 203_n from the master device 90 in step S58 described above, the devices 30_1 to 30_n reproduce the group key 202 by calculating the exclusive OR between the group device keys 201_1 to 201_n and the respective XOR values 203_1 to 203_n (step S61). When the XOR values 203_1 to 203_n are encrypted, the devices 30_1 to 30_n can decrypt them by using the UMTS security context described above.

According to the present embodiment, the amount of signaling required for transmitting the XOR values can be reduced in the 3G system. In addition, the group key can be managed securely similarly to Embodiment 3 described above. Furthermore, the security in the group key management can be further improved through the encryption of the XOR values.

Although the present invention has been described as a configuration of hardware in the above embodiments, the present invention is not limited thereto. The present invention can also be implemented by causing a CPU to execute a computer program to implement the processes in the communication terminal 10 and the node device 20.

In this case, the program can be stored with the use of a variety of types of non-transitory computer-readable media (non-transitory computer-readable medium) to be supplied to a computer. The non-transitory computer-readable media include a variety of types of tangible storage media (tangible storage medium). Examples of the non-transitory computer-readable media include a magnetic recording medium (e.g., flexible disk, magnetic tape, hard disk drive), a magneto-optical recording medium (e.g., magneto-optical disk), a CD-ROM (Read Only Memory), a CD-R, a CD-R/W, and a semiconductor memory (e.g., mask ROM, PROM (Programmable ROM), EPROM (Erasable PROM), flash ROM, RAM (Random Access Memory)). In addition, the program may be supplied to a computer in the form of a variety of types of transitory computer-readable media (transitory computer readable medium). Examples of the transitory computer-readable media include an electric signal, an optical signal, and an electromagnetic wave. Transitory computer-readable media can provide the program to a computer via a wired communication line, such as an electric wire and an optical fiber, or via a wireless communication line.

It is to be noted that the present invention is not limited by the embodiments described above, and it is apparent that various changes can be made by a person skilled in the art on the basis of the descriptions in the claims.

This application claims priority to Japanese Patent Application No. 2015-027356, filed on Feb. 16, 2015, and the entire disclosure of which is incorporated herein.

REFERENCE SIGNS LIST 10 communication terminal
11, 21 deriving unit
12 receiving unit
13 reproducing unit
20 node device
22 calculating unit
23 transmitting unit
30 device
40 eNB
50 MME
60 NB
70 RNC
80 SGSN
90 master device
100, 110 communication group
201 group device key
202 group key
203 XOR value

The invention claimed is:

1. A communication system comprising:
    a plurality of communication terminals and a master terminal that form a communication group; and
    a node device configured to carry out an authentication process on each of the communication terminals, wherein
        the node device is configured to derive first keys unique to the respective communication terminals and a second key common to the communication group, the first keys being derived by using information shared between the node device and each of the communication terminals through the authentication process,
        the node device is configured to calculate exclusive OR (XOR) values by calculating XORs between each of the first keys and the second key,
        the node device is configured to transmit the XOR values to the master terminal,
        the master terminal is configured to distribute the XOR values to the respective communication terminals, and
        each of the communication terminals is configured to reproduce the second key by calculating an XOR between the respective XOR value and the first key unique to the own communication terminal derived by using the information.

2. The communication system according to claim 1, wherein
    the node device is further configured to encrypt each of the XOR values by using a security context shared between the node device and each of the communication terminals through the authentication process and transmit the encrypted XOR values to the master terminal,
    the master terminal is configured to distribute the received encrypted XOR values to the respective communication terminals, and
    the respective communication terminals are further configured to decrypt the respective encrypted XOR values by using the security context.

3. The communication system according to claim 1, wherein the node device and each of the communication terminals use Kasme (Key Access Security Management Entity) as the information.

4. The communication system according to claim 1, wherein the node device and each of the communication terminals use CK (Cipher Key) and IK (Integrity Key) as the information.

5. A node device used in a communication system having a plurality of communication terminals and a master device that form a communication group, the node device carrying out an authentication process on each of the communication terminals, the node device comprising:
    a memory storing instructions; and
    at least one processor configured to process the instructions to:
        derive first keys unique to the respective communication terminals and a second key common to the communication group, the first keys being derived by using information shared between the node device and each of the communication terminals through the authentication process, calculate exclusive OR (XOR) values by calculating XORs between each of the first keys and the second key, and transmit the XOR values to the master terminal.

6. The node device according to claim 5, wherein the XOR values are distributed to the respective communication terminals by the master terminal.

7. The node device according to claim 5, wherein the at least one processor is further configured to process the instructions to:

encrypt each of the XOR values by using a security context shared between the node device and each of the communication terminals through the authentication process, and transmit the encrypted XOR values to the master terminal.

8. The node device according to claim 5, wherein Kasme (Key Access Security Management Entity) is used as the information.

9. The node device according to claim 5, wherein CK (Cipher Key) and IK (Integrity Key) are used as the information.

10. A communication terminal used in a communication system having a master terminal and a node device, the communication terminal forming a communication group together with the master terminal and another communication terminal, the node device carrying out an authentication process on each of the communication terminal and the another communication terminal, the communication terminal comprising:

a memory storing instructions; and at least one processor configured to process the instructions to:

derive a first key unique to the own communication terminal by using information shared between the own communication terminal and the node device through the authentication process on the own communication terminal, receive an exclusive OR (XOR) value from the master terminal, and reproduce a second key common to the communication group by calculating an XOR between the first key and the XOR value, wherein the XOR value is distributed by the master terminal, which obtains XOR values from the node device, which calculates the XOR values by calculating XORs between first keys, which are unique to the communication terminal and the another communication terminal, and the second key.

11. The communication terminal according to claim 10, wherein the XOR value received from the master terminal is encrypted by using a security context shared between the communication terminal and the node device through the authentication process, and the at least one processor is further configured to process the instructions to decrypt the encrypted XOR value by using the security context.

12. The communication terminal according to claim 10, wherein Kasme (Key Access Security Management Entity) is used as the information.

13. The communication terminal according to claim 10, wherein CK (Cipher Key) and IK (Integrity Key) are used as the information.

14. A key management method executed in a node device used in a communication system having a plurality of communication terminals and a master terminal that form a communication group, the node carrying out an authentication process on each of the communication terminals, the key management method comprising:

deriving first keys unique to the respective communication terminals and a second key common to the communication group, the first keys being derived by using information shared between the node device and each of the communication terminals through the authentication process;

calculating exclusive OR (XOR) values by calculating XORs between each of the first keys and the second key; and transmitting the XOR values to the master terminal.

15. A key management method executed in a communication terminal used in a communication system having a master terminal and a node device, the communication terminal forming a communication group together with the master terminal and another communication terminal, the node device carrying out an authentication process on each of the communication terminal and the another communication terminal, the key management method comprising:

deriving a first key unique to the communication terminal by using information shared between the communication terminal and the node device through an authentication process on the communication terminal;

receiving an exclusive OR (XOR) value from the master terminal; and reproducing a second key common to the communication group by calculating an XOR between the first key and the XOR value, wherein the XOR value is distributed by the master terminal, which obtains XOR values from the node device, which calculates the XOR values by calculating XORs between first keys, which are unique to the communication terminal and the another communication terminal, and the second key.

* * * * *